B. AND S. FRIEDMAN.
TUMBLING APPARATUS FOR FURS.
APPLICATION FILED JULY 26, 1919.
1,343,816.
Patented June 15, 1920.
2 SHEETS—SHEET 1.
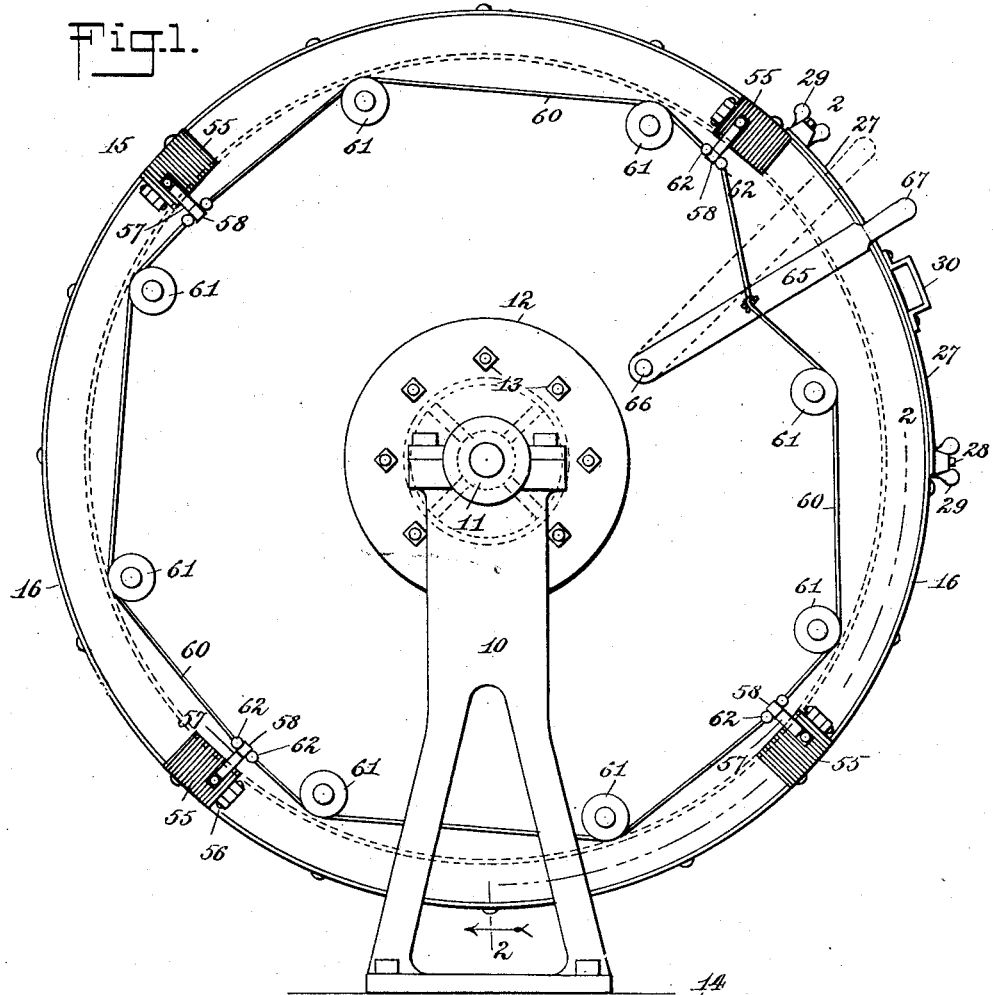
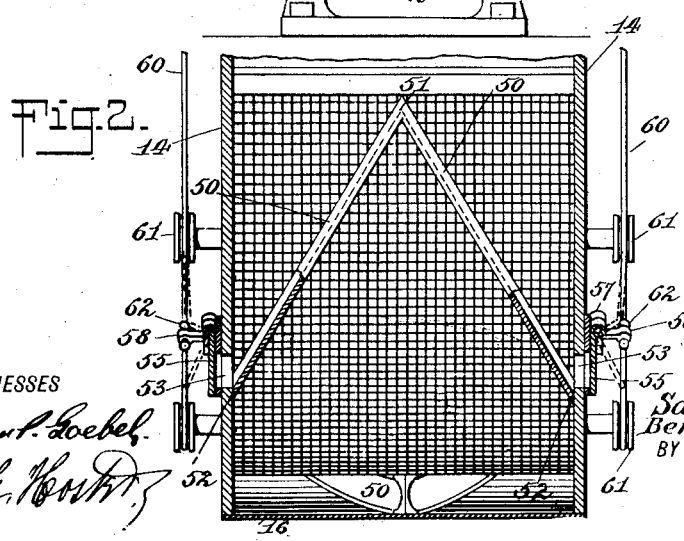

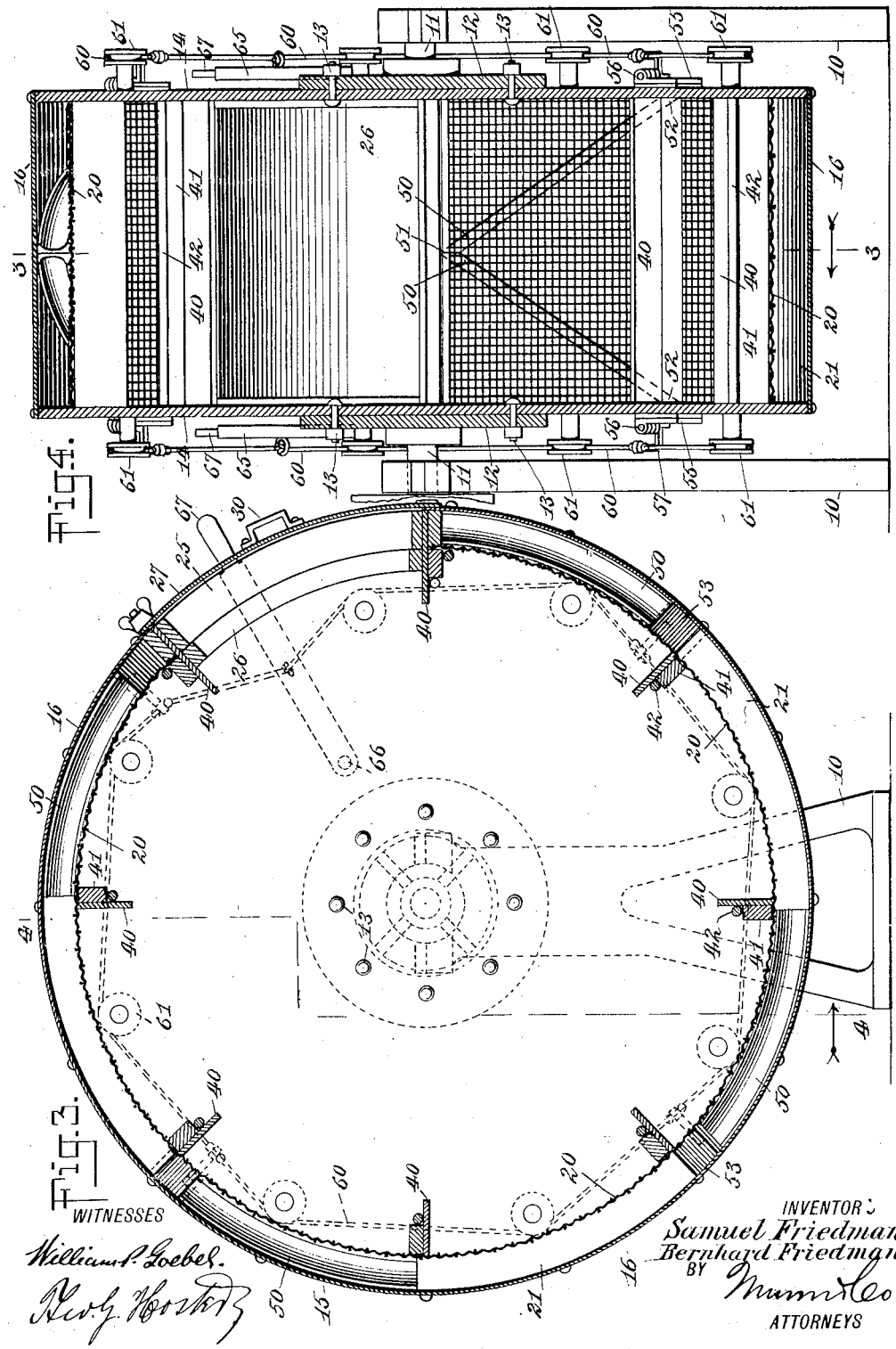

UNITED STATES PATENT OFFICE.

BERNHARD FRIEDMAN, OF NEW YORK, AND SAMUEL FRIEDMAN, OF BROOKLYN, NEW YORK.

TUMBLING APPARATUS FOR FURS.

1,343,816.  Specification of Letters Patent.  Patented June 15, 1920.

Application filed July 26, 1919. Serial No. 313,496.

*To all whom it may concern:*

Be it known that we, BERNHARD FRIEDMAN, a citizen of the United States, and a resident of the city of New York, borough of the Bronx, in the county of Bronx and State of New York, and SAMUEL FRIEDMAN, a citizen of the United States, and a resident of the city of New York, borough of Brooklyn, in the county of Kings and State of New York, have invented a new and Improved Tumbling Apparatus for Furs, of which the following is a full, clear, and exact description.

The invention relates to apparatus for softening pelts or furs by a tumbling action under the influence of sawdust or similar tumbling or rubbing material.

The object of the invention is to provide a new and improved tumbling apparatus for softening furs or pelts, arranged to insure an intense tumbling action with a view to quickly and effectively soften a large number of furs simultaneously and without danger of injuring the furs. Another object is to allow quick charging of the tumbling apparatus with the furs and the sawdust used as a tumbling material. Another object is to permit the operator after the tumbling action is completed to quickly and efficiently separate the furs and the sawdust or other tumbling material used.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1 is an elevation of one end of the improved tumbling apparatus for furs;

Fig. 2 is a sectional side elevation of a portion of the same on the line 2—2 of Fig. 1;

Fig. 3 is a cross section of the improved tumbling apparatus on the line 3—3 of Fig. 4, and Fig. 4 is a longitudinal section of the same on the line 4—4 of Fig. 3.

On suitable supports 10 are journaled trunnions 11 attached to plates 12 secured by bolts 13 to the heads 14 of a drum 15 provided with a solid rim 16. One of the trunnions 11 is connected by suitable mechanism with other machinery for imparting a rotary motion to the drum 15. Within the drum 15 is arranged a cage adapted to contain the fur to be softened and sawdust or other suitable tumbling material. The cage is formed by a perforate rim 20 attached to the heads 14 and spaced from the rim 16 thus providing an annular space 21 for receiving the sawdust through the perforations of the rim 20 and for allowing the sawdust to pass from the space 21 back into the cage for reuse with the furs. The rims 16 and 20 are provided with registering openings 25 and 26 for placing the furs and tumbling material in the cage or removing the furs therefrom. The opening 25 is normally closed by a suitable door or cover plate 27 fastened in place by bolts 28 having wing nuts 29. The door or plate 27 is also provided with a suitable handle 30 to permit the operator to conveniently place the door or plate in position over the opening 25 or to remove it therefrom.

The perforate rim 20 is provided at the inner face with radially disposed lifting bars 40 for lifting the furs and the tumbling material and dropping the same, thus insuring an effective tumbling action of the furs aided by the sawdust or other tumbling material. Each of the lifting bars 40 is reinforced by a narrow bar 41 and a rod 42, and the ends of the said lifting bar 40 reinforcing the bar 41 and the rod 42 are preferably attached to the heads 14 to provide a strong and durable lifting structure, but it is evident that I do not limit myself to the particular construction of the lifting device described.

After the tumbling action of the furs has been completed it is desirable to separate the furs and the sawdust to allow of separately removing the same from the tumbling apparatus. For the purpose mentioned, use is made of peak-shaped partitions 50 arranged in the annular space 21 and spaced apart, as plainly indicated in Fig. 3. The apexes 51 of the partitions 50 are located approximately midway between the heads 14 while the base ends 52 of the said partitions extend to openings formed in the heads 14. The openings 53 in each head are closed by doors 55 hinged at 56 to the corresponding head 14. Each of the doors 55 is provided with an angular arm 57 provided with an eye 58 through which extends a cord or similar flexible member 60 passing over guide pulleys 61 journaled on the corresponding head 14. Each eye 58 is engaged at opposite sides by balls or collars 62 attached to the flexible connection 60 so that when the latter is shifted a swinging motion is given to the doors 55 to move the same into an open or a closed position according to the direction in which the flexible connection 60 is moved at the time. The ends of the flexible connection 60 are connected with a lever 65 fulcrumed at 66 on the corresponding head 14. The free end of the lever 65 is provided with a handle 67 projecting beyond the rim 16 to permit the operator to conveniently impart a swinging motion to the lever 65 with a view to actuate the flexible connection 60 and the doors 55 to swing the latter into open position on moving the lever from the normal position shown in full lines in Fig. 1 to the position shown in dotted lines in said figure. It will be noticed that when the doors 55 are open and the drum 15 is rotated then the sawdust or other tumbling material which passes through the perforate rim 20 into the space 21 is directed by the peak-shaped partitions 50 to the open doors through which the sawdust or other tumbling material can pass to the outside of the apparatus. After the sawdust has been removed from the drum 15, the latter is brought to a standstill and the door or covering plate 27 is removed to permit of removing the softened furs from the drum 15. After this has been done, the doors 55 are allowed to swing backward into closed position on the operator returning the lever 65 to normal position, then a new batch of furs and sawdust is placed in the cage, the door or cover plate 27 is replaced, and the above described operation is repeated.

From the foregoing it will be seen that by the arrangement described, a large number of furs can be softened in a comparatively short time and without danger of injuring the furs. It will also be noticed that the sawdust can be readily separated from the furs after the tumbling operation is completed to permit of separately discharging the furs and the sawdust in one single apparatus at one operation.

The apparatus shown and described is very simple and durable in construction and is not liable to get easily out of order.

Having thus described my invention, I claim as new and desire to secure by Letters Patent:—

1. A tumbling apparatus for softening furs, comprising a revoluble drum, a cage adapted to contain the furs and a tumbling material, the said cage being arranged within the said drum and forming with the drum an annular space for the passage of the tumbling material from the cage into the space and vice versa, lifting members in the said cage for raising and dropping the furs and the tumbling material, and discharging means connected with the said annular space for discharging the tumbling material independent of the furs.

2. A tumbling apparatus for softening furs, comprising a drum having heads, an outer solid rim and an inner perforate rim forming with the outer rim a space for receiving a tumbling material, lifting members extending inwardly from the perforate rim to raise and drop the furs and the tumbling material on rotating the drum, and discharging means leading from the said space between the rims to the outside for discharging the sawdust independent of the furs after the tumbling action is completed.

3. A tumbling apparatus for softening furs, comprising a drum having heads, an outer solid rim and an inner perforate rim forming with the outer rim a space for receiving a tumbling material, lifting members extending inwardly from the perforate rim to raise and drop the furs and the tumbling material on rotating the drum, doors on the drum, and members disposed in the said annular space and leading to the said doors to discharge the tumbling material independent of the furs.

4. A tumbling apparatus for softening furs, comprising a drum having heads, an outer solid rim and an inner perforate rim forming with the outer rim a space for receiving a tumbling material, lifting members extending inwardly from the perforate rim to raise and drop the furs and the tumbling material on rotating the drum, doors on the drum, members disposed in the said annular space and leading to the said doors to discharge the tumbling material independent of the furs, and manually controlled means mounted exteriorly on the drum and connected with the said doors to open the same simultaneously.

5. A tumbling apparatus for softening furs, comprising a drum having heads, an outer solid rim and an inner perforate rim forming with the outer rim a space for receiving a tumbling material, lifting members extending inwardly from the perforate rim to raise and drop the furs and the tumbling material on rotating the drum, registering doors in the said rims for placing the furs and tumbling material within the space inclosed by the inner rim and the heads of the drum, peak-shaped partitions held in the said annular space between the rims and spaced apart, and doors on the said drum heads and to which lead the base ends of the said peak-shaped partitions to direct the tumbling material contained in the said annular space to the doors.

6. A tumbling apparatus for softening furs, comprising a drum having heads, an outer solid rim and an inner perforate rim forming with the outer rim a space for receiving a tumbling material, lifting members extending inwardly from the perforate rim to raise and drop the furs and the tumbling material on rotating the drum, registering doors in the said rims for placing the furs and tumbling material within the space inclosed by the inner rim and the heads of the drum, peak-shaped partitions held in the said annular space between the rims and spaced apart, doors on the said drum heads and to which lead the base ends of the said peak-shaped partitions to direct the tumbling material contained in the said annular space to the doors, and manually controlled means mounted on the said heads and connected with the said doors to permit of opening the doors on each head simultaneously.

BERNHARD FRIEDMAN.
SAMUEL FRIEDMAN.